(12) United States Patent
Nielsen

(10) Patent No.: US 11,293,420 B2
(45) Date of Patent: Apr. 5, 2022

(54) SUCTION MUFFLER

(71) Applicant: SECOP GMBH, Flensburg (DE)

(72) Inventor: Sven Eric Nielsen, Flensburg (DE)

(73) Assignee: SECOP GMBH, Flensburg (DE)

( * ) Notice: Subject to any disclaimer, the term of this patent is extended or adjusted under 35 U.S.C. 154(b) by 270 days.

(21) Appl. No.: 16/325,946

(22) PCT Filed: Aug. 21, 2017

(86) PCT No.: PCT/EP2017/071037
§ 371 (c)(1),
(2) Date: Feb. 15, 2019

(87) PCT Pub. No.: WO2018/036968
PCT Pub. Date: Mar. 1, 2018

(65) Prior Publication Data
US 2019/0178238 A1 Jun. 13, 2019

(30) Foreign Application Priority Data
Aug. 23, 2016 (AT) .............................. GM50172/2016

(51) Int. Cl.
*F04B 39/00* (2006.01)
*F04B 53/00* (2006.01)
*F04C 29/06* (2006.01)

(52) U.S. Cl.
CPC ...... *F04B 39/0033* (2013.01); *F04B 39/0061* (2013.01); *F04B 39/0066* (2013.01);
(Continued)

(58) Field of Classification Search
CPC .............. F04B 39/0061; F04B 39/0066; F04B 39/0072; F04B 39/0033; F04B 53/001; F04B 53/002; F04C 29/065
(Continued)

(56) References Cited

U.S. PATENT DOCUMENTS 4,111,278 A * 9/1978 Bergman ................ F01N 1/089
181/249
4,730,695 A * 3/1988 Bar ....................... F04B 39/123
181/252
(Continued)

FOREIGN PATENT DOCUMENTS

AT 009716 U1 2/2008
CN 101111677 A 1/2008
(Continued)

OTHER PUBLICATIONS

Written Opinion in PCT/EP2017/071037, 6 pages, filed Aug. 21, 2017.
(Continued)

*Primary Examiner* — Christopher S Bobish
(74) *Attorney, Agent, or Firm* — McKee, Voorhees & Sease, PLC

(57) ABSTRACT

The invention concerns a suction silencer (1) for an encapsulated refrigerant compressor, with
an inlet (5),
an outlet (6),
a damping chamber (7) connecting the inlet (5) and the outlet (6) for sound attenuation, and
an equalization chamber connected to the damping chamber (7) for equalizing the pressure of the damping chamber (7),
wherein the suction silencer (1) is provided in the operating position for integration in a compressor housing (20) of the refrigerant compressor having a bottom area (21) for reception of an oil sump (26).
To ensure a continuous pressure equalization between the damping chamber (7) and the environment even during start-up of the refrigerant compressor, it is intended in accordance with the invention that the equalization chamber is designed as a first equalization chamber (11) with a first
(Continued)

opening (9) for pressure equalization and the suction silencer (1) has a further, second equalization chamber (14) with a second opening (10) for pressure equalization.

37 Claims, 5 Drawing Sheets

(52) U.S. Cl.
CPC ........ *F04B 39/0072* (2013.01); *F04B 53/002* (2013.01); *F04C 29/065* (2013.01)
(58) Field of Classification Search
USPC .......................................... 181/403; 417/312
See application file for complete search history.

(56) References Cited

U.S. PATENT DOCUMENTS

| | | | | |
|---|---|---|---|---|
| 4,793,775 | A * | 12/1988 | Peruzzi | F04B 39/0055 417/312 |
| 5,733,106 | A * | 3/1998 | Lee | F04B 39/0072 417/312 |
| 6,155,800 | A * | 12/2000 | Todescat | F04B 39/123 417/312 |
| 7,316,291 | B2 * | 1/2008 | Thomsen | F04B 39/0061 181/229 |
| 7,866,955 | B2 * | 1/2011 | Lilie | F04B 39/0061 417/312 |
| 8,246,320 | B2 * | 8/2012 | Park | F04B 39/0055 417/312 |
| 9,752,564 | B2 * | 9/2017 | Arceno | F04B 39/0072 |
| 10,711,777 | B2 * | 7/2020 | Couto | F04B 39/0055 |
| 2009/0257892 | A1 * | 10/2009 | Svendsen | F04B 39/0061 417/312 |

FOREIGN PATENT DOCUMENTS

| | | |
|---|---|---|
| CN | 101970877 A | 2/2011 |
| DE | 10317458 A1 | 11/2004 |
| EP | 1446580 B1 | 11/2006 |
| EP | 1828603 B1 | 4/2008 |
| EP | 2265821 B1 | 12/2010 |
| JP | 5810175 A | 1/1983 |
| WO | 2005073558 A1 | 8/2005 |
| WO | 2018036968 A1 | 3/2018 |

OTHER PUBLICATIONS

English Translation of International Search Report in PCT/EP2017/071037 filed Aug. 21, 2017, 3 pages, dated Feb. 15, 2018.

* cited by examiner

SUCTION MUFFLER

CROSS-REFERENCE TO RELATED APPLICATIONS

This application claims priority to Austrian application GM 50765/2016 filed Aug. 23, 2016 and herein incorporated by reference in its entirety.

FIELD OF INVENTION

This invention concerns a suction silencer for an encapsulated refrigerant compressor with
an inlet to allow refrigerant to flow into the suction silencer,
an outlet to allow refrigerant to flow out of the suction silencer toward a piston-cylinder unit of the refrigerant compressor,
a silencing chamber connecting the inlet and outlet for silencing, and
an equalization chamber communicating with the damping chamber and communicating with the environment for equalizing the pressure of the damping chamber with the environment,
whereas the suction silencer is provided in an operating position for integration in a compressor housing of the refrigerant compressor having a trough-like bottom area for integration of an oil sump, and a refrigerant compressor with a suction silencer.

BACKGROUND OF THE INVENTION

Encapsulated, especially hermetically sealed, refrigerant compressors have been known for a long time and are mainly used in refrigeration cabinets, such as refrigerators or refrigerated shelves. The refrigerant process as such has also been known for a long time. Refrigerant is thereby heated by energy absorption from the space to be cooled in an evaporator and finally superheated and pumped to a higher pressure level using the refrigerant compressor with a piston-cylinder unit, where it gives off heat via a condenser and is conveyed back into the evaporator via a throttle in which the pressure is reduced and the refrigerant is cooled down.

The (gaseous) refrigerant is sucked in via a refrigerant supply line coming directly from the evaporator during an intake cycle of the piston-cylinder unit. In known hermetically sealed refrigerant compressors, the refrigerant supply line usually flows into the hermetically sealed compressor housing—usually near an inlet of a suction silencer (also known as a muffler), from where the refrigerant flows into the suction silencer and through it to a intake valve of the piston-cylinder unit. The suction silencer serves primarily to keep the noise level of the refrigerant compressor as low as possible during the suction process. Known suction silencers usually consist of a damping chamber, which can be divided into several interconnected damping volumes, for example by intermediate walls or partition walls. These damping volumes dampen sound based on the well-known Helmholtz principle, i.e. the damping volumes in the damping chamber act as resonators that absorb sound. In addition to the inlet through which the refrigerant flows into the interior of the suction silencer, known suction silencers have an outlet that lies close to the intake valve of the piston-cylinder unit and through which refrigerant is sucked into the cylinder during the intake cycle.

If the outlet of the refrigerant supply line does not open directly into the inlet or an inlet opening of the suction silencer, the cold refrigerant coming from the suction pipe can be heated as follows and mixed unintentionally with the refrigerant already in the compressor casing and heated by the waste heat from the piston-cylinder unit. On the one hand, the intake valve of the piston-cylinder unit is only open per cycle in the intake cycle over a crank angle range of approximately 180°, and therefore refrigerant can only be sucked into the cylinder of the piston-cylinder unit of the refrigerant compressor within this time window. On the other hand, the cold refrigerant flows out of the refrigerant supply line into the compressor housing even when the intake valve is closed. As a result, the refrigerant entering the compressor casing heats up, as the refrigerant in the compressor casing cools the piston-cylinder unit heated by the operating waste heat and its components, and it is mixed with the warmer refrigerant already in the compressor casing.

In order to avoid the heating of the refrigerant flowing from the refrigerant supply line and to further reduce the noise level of the refrigerant compressor, it is known from state-of-the-art technology to connect the refrigerant supply line as directly as possible to the inlet opening of the suction silencer, so that the refrigerant coming from the evaporator is led almost completely directly into the suction silencer and only a negligibly small proportion of the refrigerant from the refrigerant supply line reaches the inside of the compressor housing and heats up there. In an optimally designed compressor, all of the refrigerant entering the compressor is transferred directly to the suction silencer, but this condition is very difficult to achieve in practice due to minor leaks.

However, due to the fact explained below that the cold refrigerant flows into the suction silencer—now via the direct connection—even when the intake valve is closed, it is necessary to provide an equalization chamber in the suction silencer that is connected to the damping chamber and the environment in order to enable pressure equalization between the suction silencer and the environment, i.e. pressure equalization with the inside of the compressor housing in the operating position.

During the intake cycle, more refrigerant is drawn in by the piston than can flow into the suction silencer via the refrigerant supply line during the same period. The difference in refrigerant is compensated, on the one hand, by the refrigerant in the damping chamber and, on the other, by the refrigerant in the expansion chamber. If the equalization chamber did not communicate with the inside of the compressor housing so that gaseous refrigerant could flow from the compressor housing into the equalization chamber or via the equalization chamber into the damping chamber, there would be a strong pressure drop in the damping chamber during suction, which would result in less refrigerant being sucked into the cylinder of the piston-cylinder unit. The pressure drop in the suction silencer can be considerably reduced and the efficiency of the refrigerant compressor improved due to pressure equalization with the environment.

During the subsequent compression cycle of the piston-cylinder unit, refrigerant flows from the refrigerant supply line into the suction silencer, resulting, on the one hand, from the pressure difference between the suction silencer and the refrigerant supply line and, on the other hand, to a small extent, from the kinetic energy of the refrigerant. The refrigerant flows inside the refrigerant compressor via the damping chamber and the equalization chamber.

Due to the previously described flow characteristics of the refrigerant, during operation of the refrigerant compressor, the gas column located in the expansion chamber oscillates continuously, with a proportion of cold refrigerant from the refrigerant supply line and warm refrigerant from the inside of the compressor housing varying depending on the crank angle.

If, for example, liquid refrigerant reaches the suction silencer via the refrigerant supply line, it usually evaporates due to the higher temperature level in the suction silencer for evaporating the liquid refrigerant, caused, for instance, by the waste heat from the electric drive unit and the piston/cylinder unit. Due to the increase in volume caused by evaporation, an overpressure would form in the suction silencer if the pressure equalization were not provided by the equalization chamber, which could lead to damage to the suction silencer, in extreme cases even to destruction of the suction silencer, and/or to damage to the connection between refrigerant supply line and inlet.

In order to lubricate the piston-cylinder unit during operation and thus to ensure its functional efficiency, a defined quantity of lubricant, such as lubricating oil, is provided, which is deposited in the form of an oil sump in a trough-shaped bottom area of the refrigerant compressor. When the coolant compressor is operating, this floor area can also serve as a contact surface for the piston-cylinder unit, in particular for the electric drive unit driving the piston. However, the piston-cylinder unit can also be supported by brackets attached to the compressor housing so that the base area does not serve as a contact surface.

As described above, there is usually a gaseous refrigerant inside the compressor housing, which usually flows from the refrigerant supply line into the compressor housing via the suction silencer during idle phases of the refrigerant compressor, or is introduced into the compressor housing when the refrigerant compressor is loaded with refrigerant. This gaseous refrigerant mixes with drop-shaped lubricant during operation to form a refrigerant-lubricant mist. Since the refrigerant from the refrigerant supply line and the refrigerant containing drops may mix in the expansion chamber, albeit to a small extent, lubricant can enter the expansion chamber in the intake cycle, which settles to a large extent on the inner walls or partitions of the expansion chamber and flows downward. Lubricant can also enter the coolant circuit via leaks in the piston-cylinder unit, which eventually means it enters the suction silencer. In order to facilitate the discharge of the lubricant accumulated in the damping chamber or also of liquid refrigerant, the bottom of the suction silencer usually has at least one oil drain opening. This oil drain opening has a relatively small diameter and is usually only a bore with a drip nose located on the outside of the suction silencer. However, at least one oil drain opening, which has been state of the art for decades, is not a compensation chamber according to the generic term of the main claim, since the oil drain opening is closed by an oil film during operation and the diameter of the oil drain opening is far too small to guarantee the necessary pressure compensation. This can be explained solely by the fact that the speed of generic refrigerant compressors under full load is generally within a range of between 3,000 and 3,600 revolutions per minute, so that despite up to 120 cycle changes per second between intake cycle and compression cycle, pressure compensation must be guaranteed, which can only be achieved with corresponding flow cross sections.

To prevent an accumulation of lubricant, which can enter the equalization chamber by suction of the refrigerant-lubricant mist, in the equalization chamber, the opening of the equalization chamber is usually formed on an underside of the suction silencer in the vicinity of the oil sump to allow lubricant to flow from the equalization chamber into the oil sump.

A downside to the state of the art, however, is that a clogging of the opening of the equalization chamber leads to the fact that there is no pressure equalization between the damping chamber and the environment, i.e. the interior of the suction silencer. This results in a considerable loss of performance of the refrigerant compressor, as the pressure drop in the suction silencer cannot be compensated. This means that considerably less (gaseous) refrigerant enters the piston-cylinder unit during the intake cycle, so that less refrigerant is compressed even during the compression cycle.

In particular, the opening may be clogged if the refrigerant compressor is restarted after a rest period during which most of the lubricant accumulates in the oil sump and the level of the oil sump reaches its maximum. During the idle phase, cooling of the refrigerant compressor may cause gaseous refrigerant to condense inside the compressor housing or liquid refrigerant not to evaporate immediately. This causes a mixture of lubricant and liquid refrigerant to form in the oil sump, which causes the level of the oil sump to rise. If this level rises to the opening of the equalization chamber, a liquid lubricant/refrigerant mixture is sucked into the piston-cylinder unit via the equalization chamber and the damping chamber in the intake cycle, in addition to preventing pressure equalization. The liquid mixture may, in particular, damage the valve springs, mainly the intake valve.

Even if the maximum level of the liquid lubricant/refrigerant mixture is below the opening of the equalization chamber, the opening of the equalization chamber may still be at least partially blocked when the refrigerant compressor is switched on. When the refrigerant compressor is switched on, the movement of the piston causes a vacuum to form inside the compressor housing, causing the liquid lubricant/refrigerant mixture to boil and the dissolved liquid refrigerant to evaporate. In this process, the liquid lubricant/refrigerant mixture foams up so that the resulting foam closes the opening of the equalization chamber, prevents pressure compensation and, additionally, lubricant/refrigerant foam is sucked into the suction silencer or into the piston-cylinder unit. Although this operating mode does not last long, considerable performance losses occur and there is a risk of damage to the valve springs.

In both described cases, pressure equalization between the suction silencer and the inside of the compressor housing is prevented, so that the pressure drop in the suction silencer cannot be equalized and less refrigerant enters the piston-cylinder unit. If liquid refrigerant reaches the suction silencer via the refrigerant supply line and evaporates there during the obstruction of the pressure compensation, a pressure rise may occur in the suction silencer, which is associated with the dangers described above.

OBJECTIVE OF THE INVENTION

It is therefore one of the objectives of the invention to overcome the downsides of the state of the art and to propose a suction silencer for an encapsulated refrigerant compressor that ensures continuous pressure equalization between the damping chamber and the environment even in the event of blockage of the opening of the equalization chamber, in particular during start-up of the refrigerant compressor.

SUMMARY OF THE INVENTION

This objective is performed in a suction silencer according to the invention for an encapsulated refrigerant compressor, with an inlet to allow refrigerant to flow into the suction silencer, an outlet to allow refrigerant to flow out of the suction silencer toward a piston-cylinder unit of the refrigerant compressor, a damping chamber connecting the inlet and the outlet for sound damping, and an equalization chamber connected to the damping chamber and communicating with the environment for pressure equalization of the damping chamber with the environment, whereas the suction silencer is designed in an operating position for integration in a compressor housing of the refrigerant compressor, which has a trough-like bottom region for integration of an oil sump, so that the equalization chamber is designed as the first equalization chamber with an initial opening for pressure equalization, and the suction silencer has a further, second equalization chamber with a second opening for pressure equalization.

By providing two separate equalization chambers, each communicating with the environment through an opening independent of the opening of the other equalization chamber and with the inside of the compressor casing in the operating position, permanent pressure equalization between the damping chamber and the environment is possible. The equalization chambers can be designed separately from each other, whereby it is conceivable that the two equalization chambers are not directly connected to each other, but only indirectly via the respective connection to the damping chamber. For example, the equalization chambers may be of different sizes and have different volumes, whereby it is also conceivable to provide equalization chambers with similar or equal volumes. Usually, the equalization chambers are only connected to the environment through the openings assigned to them so that, in the operating position, refrigerant from the inside of the compressor casing can only enter the first equalization chamber directly through the first opening and enter the second equalization chamber directly through the second opening. To prevent both openings from being blocked at the same time, it may be provided that the second opening is located above the first opening, preferably in a vertical direction of the refrigerant compressor. In other words, the first opening and the second opening, in the direction of the refrigerant compressor height, which normally corresponds to the direction of the suction silencer height, are spaced apart from each other.

In a design variant of the invention, it is provided that the suction silencer has at least one fastening section for connection to the piston-cylinder unit and that the at least one fastening section is designed in such a way as to enable a fastening of the suction silencer to the piston-cylinder unit, in which the second opening is arranged above the first opening with respect to the bottom region of the compressor housing. The suction silencer is fixed in the operating position to the piston-cylinder unit, in particular to the cylinder head, or more precisely to the cylinder head cover, by the fastening section, which is preferably formed in the region of the outlet or by the outlet itself, and is thus arranged in the compressor housing as fixed. The position of the suction silencer relative to the other components of the refrigerant compressor as described below can be easily adjusted by the appropriate design of the mounting section.

The first opening of the first equalization chamber is usually on the underside of the suction silencer, so that lubricant or liquid refrigerant can drip off or flow off from the equalization chamber. As a rule, the first opening is located above the oil sump formed in the bottom area of the compressor housing, whereby the first opening may still be blocked in the operating conditions described above.

However, as the two openings are arranged at different heights of the suction silencer relative to each other, and therefore also relative to the bottom area of the compressor housing in the operating position, it is ensured that even if the first opening, which is located closer to the bottom area in the operating position, is closed with a liquid lubricant/refrigerant mixture or lubricant/refrigerant foam from the oil sump, pressure equalization with the environment is ensured through the second opening, which is farther away from the bottom area of the compressor housing in the operating position. In any event, pressure equalization is ensured by the second opening, because even if the first opening is blocked, refrigerant can be sucked from the inside of the compressor housing into the second equalization chamber through the second opening, so that refrigerant can flow in the direction of the damping chamber at least via the second equalization chamber. The equalization chambers are arranged in such a way that the distance between the second opening of the second equalization chamber and the bottom area of the compressor casing is greater than the distance between the bottom area of the compressor casing and the first opening of the first equalization chamber. In other words, the first opening is a lower opening and the second opening is an upper opening. The distance may be determined as the normal distance between a plane parallel to a contact surface of the refrigerant compressor and passing through the lowest point of the floor area and the centers of the openings.

One design variant of the invention provides that a flexible connecting element is attached to the inlet to connect an inlet port of the suction silencer located at the inlet in the operating position to a refrigerant supply line opening into the compressor housing to allow refrigerant to flow from the refrigerant supply line directly into the suction silencer. The flexible connecting element, which may comprise, for example, a plastic sleeve and a stabilizing metal element, is as a rule tubular, in particular telescopic, and allows the refrigerant to flow directly from the refrigerant supply line via suction silencer to the intake valve and, at the same time, to reduce the propagation of sound, in particular noise from the suction silencer, inside the compressor casing. This is preferably done without the refrigerant being distributed inside the compressor housing or mixed with the refrigerant inside the compressor housing. It goes without saying that, due to the near impossibility of completely sealing the flexible connection element in practice, a share of the refrigerant can still enter the inside of the compressor housing, but this share is negligibly small. However, it is virtually impossible for heated refrigerant to enter the flexible connecting element, meaning that the efficiency of the refrigerant compressor is virtually unaffected. The flexible design of the connecting element would result in a risk that, according to the state of the art, the flexible connecting element could be damaged or even destroyed by the pressure surges caused by the stroke of the piston or by overpressure developing in the suction silencer if the pressure is not equalized due to a closure in the opening of the equalization chamber. The suction silencer designed in accordance with the invention effectively prevents destruction of or damage to the flexible connecting element. Liquid refrigerant can also flow out of the suction silencer through the two openings, in particular through the first opening, if the refrigerant compressor is supplied with refrigerant via the refrigerant supply line before first operation. Usually, however, the filling takes place via a process tube provided for this purpose.

It is particularly beneficial to design the suction silencer with a split housing comprising at least two housing parts in order, for example, to enable production by means of an injection molding process. However, the housing parts are tightly connected to each other, at least in the operating position, so that refrigerant from the suction silencer can only enter the suction silencer via the inlet or openings of the equalization chambers and can only escape via the outlet or openings of the equalization chambers.

In a first design variant, the housing comprises a first and a second housing part. The first housing part is as a rule designed as the lower part of the suction silencer, that is in the operating position at least in sections, i.e. in the area of its underside, facing the bottom area of the compressor housing. The second part of the housing forms the upper part or the cover of the suction silencer, whereas the inlet or the outlet or the inlet and the outlet are formed by the second housing part. In the operating position, the second housing part is therefore farther away from the floor than the first housing part. The main part of the housing forming the damping chamber can be formed by both the first and second housing parts, but preferably by the first housing part. Therefore, in accordance with a further execution variant, it is intended that the suction silencer comprises at least a first housing part and a second housing part, the inlet and/or the outlet being formed by the second housing part.

According to another design variant of the invention, it is intended that the first equalization chamber with the first opening is formed in the first housing part. This allows the first equalization chamber together with the first opening to be formed in a simple manner during the production of the first housing part, e.g. by injection molding. At the same time, the first opening in the operating position is positioned close to the bottom of the compressor housing, especially if the first opening is on the underside of the first housing part.

In a second design variant, the housing comprises three housing parts: the first housing part, which in turn is formed as the lower part of the suction silencer, the second housing part, which also forms the upper part of the housing, and a third housing part arranged between the first and second housing parts, which acts as the middle part and thus forms the majority of the outer surface of the suction silencer. Therefore, it is intended that the suction silencer comprises a first housing part, a second housing part and a third housing part, wherein the third housing part is arranged between the first housing part and the second housing part. This further simplifies the production of the suction silencer, as the complex geometry of the damping chamber can be formed by manufacturing the central part, for example by injection molding, while the inlet and outlet are separate from the first and/or second housing parts. As shown below, the training of the two equalization chambers is also simplified considerably. It is beneficial if the first housing part, i.e. the lower part, has the first opening.

As such, by dividing the housing into three parts, a first section of the first equalization chamber can be formed by the first housing part and a second section of the housing can be formed by the adjacent third housing part, whereby different cross sections in the sections can be produced in a simple manner. Therefore, in a further variant of the second design variant, it is intended that the first equalization chamber has a first section limited by the first housing part and a second section limited by the third housing part, whereas the first opening is executed in the first section.

A beneficial variant of the second design variant provides that the first section is formed as a tubular extension of the first housing part that is narrower than the second section. The tubular extension allows the cross-sectional area of the first opening to be reduced in a simple manner in relation to the cross-sectional area of the larger second section. If the cross-sectional area of the first opening were too large, suction noises from the piston-cylinder unit could pass from the suction silencer into the compressor housing, which would undesirably increase the noise level of the refrigerant compressor. However, a significant narrowing of the cross section is extremely difficult to achieve, especially in the case of one-piece housing parts produced by injection molding. However, if the two different cross sections are divided into two separately producible sections formed by different housing parts, both sections may have easily producible different cross-sectional surfaces, so that a shoulder or cross-sectional constriction is formed after the housing parts have been assembled.

The refrigerant compressor will operate under particularly favorable conditions if the cross-sectional area of the first opening is between 5% and 50%, preferably between 10% and 30%, in particular between 15% and 20%, of an average cross-sectional area of the first equalization chamber. The reference value is the mean cross-sectional area of the first equalization chamber, which is usually the larger volume of the two equalization chambers. This mean cross-sectional area can be easily determined by determining the volume of the first equalization chamber (by a test, for example, or by mathematical methods), by determining the height of the first equalization chamber, and by equating the determined volume with the volume of a cylinder having a circular base, the cylinder having the same height as the equalization chamber. If the volume of the first equalization chamber is divided by the height, the mean cross-sectional area of the first equalization chamber is immediately obtained.

In accordance with a preferred design variant of the suction silencer according to the invention, which may comprise two, three or more housing parts, the second equalization chamber is formed at least in sections in the second housing part, the second opening being formed in the second housing part. Since, in the operating position, the second housing part faces away from the bottom region at least in sections, i.e. in the region of its upper side, and functions as an upper part or cover of the suction silencer, the formation of the second opening in the second housing part simply ensures that the second opening is arranged above the first opening. Preferably, the second opening is arranged on the upper side of the second housing part to create the greatest possible distance from the first opening. In particular, if the two equalization chambers do not communicate directly with each other, it may be beneficial for production if the second equalization chamber is formed exclusively in the second housing part. However, if the two equalization chambers are directly connected, it may be beneficial if one part of the second equalization chamber is formed in the second housing part and the other part is formed in the adjacent first housing part (in the event of only two housing parts) or third housing part (in the event of three housing parts).

To improve the flow conditions in the equalization chambers and to achieve a uniform oscillation of the gas columns in the equalization chambers, a further preferred design variant is that the second equalization chamber opens into the first equalization chamber. At the point of discharge, the longitudinal axes of the equalization chambers may either be oblique, parallel or aligned to each other, or may be at right angles to each other, the second equalization chamber, which is usually smaller, merging into the first larger equalization chamber. This ensures that the equalization chambers are directly connected to each other and that refrigerant can transfer directly from one equalization chamber to the other. This also allows pressure equalization between the two equalization chambers, so that when the first opening is closed, refrigerant can flow from the inside of the compressor housing through the second opening and the second equalization chamber directly into the first equalization chamber. Preferably, the second equalization chamber opens into the first equalization chamber in the end region of the first equalization chamber opposite the first opening, in particular in an upper limit section of the first equalization chamber.

During operation of the refrigerant compressor, part of the lubricant or lubricating oil in drop form is present inside the compressor housing mixed with gaseous refrigerant in mist form, whereby lubricant may also drip directly from the piston-cylinder unit. This lubricant usually accumulates in the oil sump at the bottom of the compressor housing due to gravity. However, during this lubricant circuit, lubricant may also accumulate on the top of the second part of the housing, which may cause lubricant to be sucked into the second equalization chamber or even the damping chamber through the second opening. The same applies to lubricant drops that are sucked together with the refrigerant from the inside of the compressor housing. Also, to prevent lubricant from being sucked into the damping chamber in larger quantities via the second opening or lubricant from accumulating in the second equalization chamber, it is especially beneficial if the second equalization chamber flows into the first equalization chamber. Due to the difference in height between the two openings, lubricant entering through the second opening may drain through the first orifice due to the effect of gravity. It is beneficial if the compensating chambers are designed in such a way that a continuous gradient between the second and first openings allows the water to flow off.

A further improvement in the flow conditions is achieved in a particularly preferred version of the invention by the fact that the first equalization chamber has a first longitudinal axis and is of tubular design and/or that the second equalization chamber has a second longitudinal axis and is of tubular design, preferably with a circular cross section. Tubular is understood to be an elongated hollow body with any cross-sectional geometry, which extends in the direction of a longitudinal axis. The first and/or second longitudinal axis is preferably designed as a straight line, but a curved or discontinuous course of the longitudinal axes is also conceivable. The cross-sectional geometry of the first or second compensation chamber, normal to the respective longitudinal axis, can have any geometrical shape, such as rectangular, triangular, elliptical. However, it has proved to be particularly beneficial for manufacturing reasons if the cross section of the second equalization chamber is approximately circular in normal shape to the second longitudinal axis. The cross-sectional geometry does not necessarily have to be constant over the entire length of the compensating chambers, but can vary.

Another preferred design variant of the suction silencer according to the invention provides that the first longitudinal axis and the second longitudinal axis are arranged parallel to each other, preferably in alignment. Due to the parallel course, the flow conditions in the two equalization chambers can be influenced particularly favorably. In particular, when the longitudinal axes are parallel to a vertical direction of the refrigerant compressor, the above discharge effect of lubricant entering through the second opening and leaving through the first opening is particularly pronounced, so that only a negligible amount of lubricant can enter the damping chamber through the second opening or accumulate in the equalization chambers. When the longitudinal axes are aligned, they are parallel, on the one hand, and form a common longitudinal axis, on the other.

To ensure that the transfer of refrigerant between the first equalization chamber and the second equalization chamber takes place with as little flow loss as possible, a design variant may be provided in which the cross section of the second opening, seen in the direction of the first longitudinal axis, preferably seen in the direction of the first and second longitudinal axes, overlaps the cross section of the first opening. The overlap can be more preferably between 25% and 100%, especially between 30% and 80%, especially preferred between 40% and 60%. In other words, the distance between the first longitudinal axis and the second longitudinal axis is less than the sum of the radii of the two openings if the cross sections are circular. Cross section is always to be understood as the cross section normal to the respective longitudinal axis of the equalization chamber. It is particularly beneficial if the cross section of the second opening is arranged within the cross section of the first opening, i.e. the two openings completely overlap each other. In other words, the distance between the longitudinal axes is less than or equal to the difference between the radius of the first opening and the radius of the second opening.

In order to ensure pressure equalization between the suction silencer and the environment, i.e. the inside of the compressor casing, during operation of the refrigerant compressor and therefore to support the formation of the oscillating gas column, the volume of the equalization chambers must be of a certain size. Therefore, in another particularly preferred execution variant of the invention, it is intended that the volume of the first equalization chamber is dimensioned such that the volume is 0.05 to 2 times, preferably 0.1 to 1 times, in particular 0.2 to 0.5 times, the stroke volume of the piston of the piston-cylinder unit. Since the pressure difference is caused by the piston movement, more precisely by the stroke volume of the piston, the volume of the compensating chamber must also be matched to the stroke volume of the piston. Preferably, the volume of the first equalization chamber is a fraction of the piston stroke volume, about one tenth, one fifth or one quarter of the stroke volume, since the bulk of the refrigerant comes from the refrigerant supply line.

It has been shown to be particularly beneficial if the first equalization chamber acts as the main equalization chamber so that, during operation, a major part of the refrigerant required for pressure expansion can be exchanged with the equalization chamber via the first equalization chamber, i.e. the first equalization chamber has a relatively large volume for the formation of an oscillating gas column. In this case, the second equalization chamber makes only a small contribution to the total volume exchanged during regular operation and therefore requires a smaller volume overall for a smaller oscillating gas column. Therefore, another particularly preferred design variant intends that the volume of the second equalization chamber is between 5% and 25%, preferably between 10% and 20%, particularly preferably between 12% and 17%, of the volume of the first equalization chamber.

Since the cross-sectional area of the first or second opening is to be regarded as authoritative for the volume that can be sucked in, it is intended in a further particularly preferred design variant on account of the benefits mentioned above that the cross-sectional area of the second opening is between 5% and 50%, preferably between 10% and 30%, in particular between 15% and 20%, of an average cross-sectional area of the first equalization chamber. The mean cross-sectional area can be calculated as described above. This ensures that the gas column in the second expansion chamber has a lower amplitude than the gas column in the first equalization chamber, so that the suction of hot refrigerant from the inside of the compressor housing into the equalization chamber during normal operation is largely avoided. At the same time, the constriction in the area of the second opening means that suction noises from the suction silencer do not reach the inside of the compressor housing or only reach it in a reduced form. The cross section of the openings is preferably normal to the respective longitudinal axis. It may be provided that the cross-sectional areas of the first and second openings are approximately the same size.

In order to reduce the amount of lubricant sucked into the damping chamber and to allow the exchange of refrigerant between the equalization chambers and the damping chamber, a further preferred design variant of the invention provides that a transition channel connects the damping chamber to the first equalization chamber to allow the exchange of refrigerant, the transition channel being located in the end region of the first equalization chamber opposite the first opening, and/or that a transition channel connects the damping chamber to the second equalization chamber to allow the exchange of refrigerant. If the transition channel is connected to the first damping chamber, it is beneficial if the lubricant sucked into the first equalization chamber at the end of the first equalization chamber opposite the oil sump, preferably at the highest point of the first equalization chamber, flows into the first equalization chamber, since lubricant sucked into the first equalization chamber via the first opening would first have to be sucked in over the entire length of the equalization chamber in order to get into the damping chamber. Since, however, the pressure equalization in this case, as invented, takes place via the second opening, the suction effect in the first equalization chamber is usually too low for large quantities of lubricant or lubricant/refrigerant foam to actually reach the damping chamber. In addition, the first equalization chamber usually has a larger volume, with the majority of the refrigerant flowing in and out flowing through the first opening into the suction silencer in normal operating mode. The direct connection between the first equalization chamber and the damping chamber via the connecting channel also reduces flow losses. In alternative design variants, the transition channel can also connect the damping chamber directly to the second equalization chamber, i.e. open into the second equalization chamber, or each of the equalization chambers is connected to the damping chamber via a preferably separate transition channel.

To keep the pressure fluctuations inside the compressor housing caused by the piston movement low, i.e. to prevent or reduce the propagation of the pressure fluctuations from the suction silencer into the environment, it may be provided that an average cross-sectional area of the transition channel is between 5% and 50%, preferably between 10% and 30%, in particular between 15% and 20%, of the average cross-sectional area of the first equalization chamber.

Another particularly preferred design variant provides that the transition channel is arranged in parallel to the first longitudinal axis and is formed in the first or third housing part. As the transition channel runs in parallel to the first longitudinal axis of the first equalization chamber, the refrigerant can be sucked in or pushed out over the entire length of the first equalization chamber without significant flow losses. During regular operation, i.e. when the first opening is free, this also leads to a reduction in the noise level of the suction silencer. In the two-part execution, the transition channel is formed in the first housing part, i.e. the lower part, while the transition channel is formed in the multi-part execution, in particular three-part execution, in the third housing part, i.e. the middle part.

The task set above is also solved by an encapsulated refrigerant compressor which has a compressor housing, preferably hermetically sealed, into which compressor housing refrigerant can be supplied via a refrigerant supply line, a piston-cylinder unit cyclically compressing the refrigerant operating inside the compressor housing with an intake valve comprising an intake opening arranged in a valve plate of the piston-cylinder unit, whereas the compressor housing has a trough-like base region for integrating an oil sump for lubricating the piston-cylinder unit, whereas a suction silencer in accordance with the invention, which conducts the refrigerant from the refrigerant supply line to the intake valve, is arranged in the compressor housing in operating position in such a way that the second opening is arranged above the first opening with respect to the base region of the compressor housing.

As the respective openings of the two equalization chambers are arranged at different heights relative to the bottom area of the compressor housing of the intake silencer and therefore, in accordance with the invention, the second opening is arranged above the first opening, it is ensured that even if the first opening, arranged closer to the bottom area, is closed, for example with lubricant from the oil sump, pressure equalization with the environment is ensured via the second opening farther away from the bottom area of the compressor housing. The suction silencer preferably comprises at least two housing parts, in particular three housing parts, wherein the second opening is formed in the second housing part of the suction silencer, which is higher relative to the bottom area, and the first opening is formed in the first housing part of the suction silencer, which is lower relative to the bottom area.

A design variant of the invention intends that at least the second opening of the second equalization chamber, preferably the first opening and the second opening, is arranged above a forming level of the oil sump, preferably in a resting phase of the refrigerant compressor.

The level of the oil sump is usually formed at delivery before the refrigerant compressor has been put into operation for the first time, or after a rest period if the refrigerant compressor has not been in operation for a longer period, because in both cases the lubricant intended for lubricating the piston-cylinder unit is not conveyed to the piston-cylinder unit but collects or settles due to gravity in the bottom area of the compressor housing. The level of the oil sump can vary due to the formation of a liquid refrigerant/lubricant mixture as described above. As previously described in detail, the pressure equalization between the damping chamber and the inside of the compressor housing can be ensured if the second opening of the second equalization chamber is located above the level of the oil sump. This prevents the formation of a lubricant/refrigerant mixture in the bottom area of the refrigerant compressor or the foaming of the mixture from clogging the second opening. Therefore, the pressure equalization is also guaranteed in these operating conditions.

To position the suction silencer and thus the equalization chambers and the openings of the equalization chambers correctly in relation to the bottom area of the compressor housing, an execution variant of the invention provides that the fastening section of the suction silencer is attached to a cylinder head of the piston-cylinder unit. The mounting section can be fastened to the cylinder head using screw or clamp connections, for example. It is particularly beneficial if the fixing section is formed in the area of the outlet or through the outlet itself and is received at least in sections in the cylinder head where a cylinder head cover clamps the fixing section in the cylinder head.

In a design variant of the refrigerant compressor in accordance with the invention, it is intended that a flexible connecting element connects the refrigerant supply line and the inlet opening of the suction silencer formed from the inlet to each other in order to allow refrigerant to flow from the refrigerant supply line via the suction silencer directly to the intake valve. As the refrigerant coming from the refrigerant supply line flows through the flexible connecting element directly into the suction silencer and cannot flow into the inside of the compressor housing, ensuring pressure equalization at any time of operation in accordance with the invention is of increased importance to prevent damage to or destruction of the suction silencer and/or the flexible connecting element. In other words, only the design and positioning of the suction silencer in accordance with the invention ensures that the flexible connecting element is not destroyed or damaged by pressure surges in the suction silencer and thus retains its functionality.

Theoretically, it could even be intended that the first opening of the first equalization chamber is located below the level of the oil sump. As the pressure equalization in the operating conditions in which the oil sump has reached its maximum level passes through the second opening of the second equalization chamber, the available installation space in the compressor housing can be optimally utilized by the suction silencer so that the first opening can be arranged below the level. After the lubricant circuit is resumed after the first revolutions of the crankshaft, the level of the oil sump drops to the operating level below the maximum level, so that the first opening is released and pressure equalization can also take place via the first opening. In principle, however, such an arrangement would result in lubricant or lubricant/refrigerant mixture entering the suction silencer through the oil drain opening or not being able to escape from the damping volume through the oil drain opening.

To use the space available in the compressor housing as economically as possible and at the same time to allow lubricant to flow out of the first equalization chamber, it is beneficial if the first opening of the first equalization chamber in the operating position faces the bottom area of the compressor housing, i.e. is formed on an underside of the suction silencer. Because in this case, there is a risk of blockage by lubricant or of lubricant being sucked in through the first opening, the second opening of the second equalization chamber in the operating condition faces away from the floor area, in other words on a lateral wall or on the top of the suction silencer, for example, to ensure reliable pressure equalization. Therefore, a further version of the invention intends that the first opening in the operating state faces the floor area and the second opening in the operating state faces away from the floor area.

It is particularly beneficial to manufacture the suction silencer with a split housing, for example to enable production by means of an injection molding process. In the operating position, the housing parts are tightly connected so that refrigerant can only escape from the suction silencer through the outlet or through the equalization chambers. In the operating position, one of the housing parts is executed as a lower part of the suction silencer, i.e. at least in sections, i.e. in the region of its underside, facing the bottom region of the compressor housing, whereas it is theoretically possible for the underside of the first housing part to be arranged at least in sections in the oil sump. A further part of the housing accordingly faces away from the floor area and forms the upper part or the cover of the suction silencer.

BRIEF DESCRIPTION OF THE FIGURES

The invention is now explained in more detail using an embodiment example. The drawings are examples and are intended to illustrate the idea of the invention, but in no way restrict it or even finally reproduce it.

Shown are.

WAYS OF EXECUTING THE INVENTION

Figure 1:
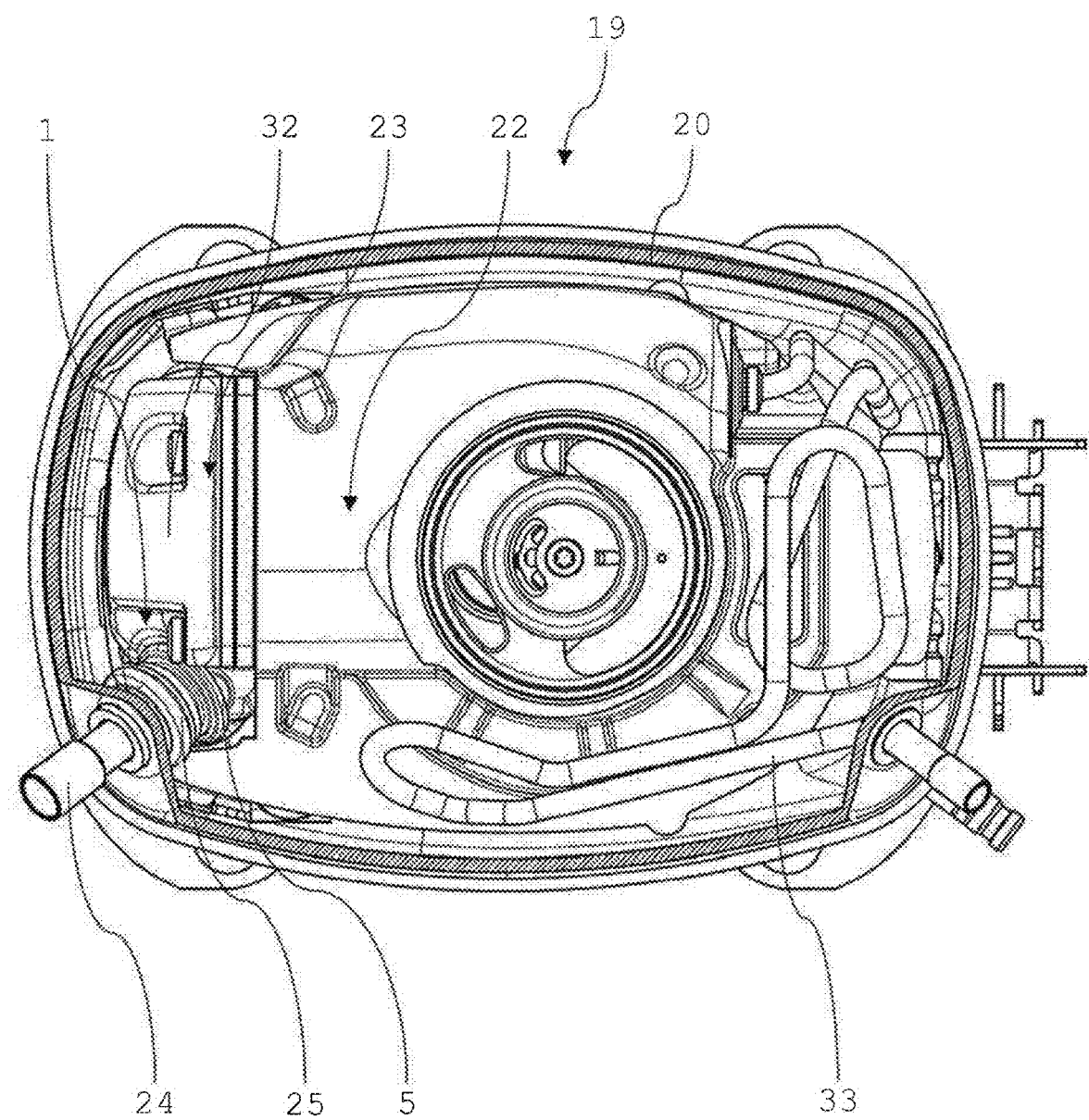
FIG. 1 shows a cross-sectional view of a refrigerant compressor with a suction silencer according to the invention.

FIG. 1 shows an execution variant of a preferably hermetically encapsulated refrigerant compressor 19 in accordance with the invention with a suction silencer 1 in accordance with the invention. The refrigerant compressor 19 comprises a preferably hermetically encapsulated compressor housing 20, inside which, in the operating condition, a piston-cylinder unit 22 cyclically compressing the gaseous refrigerant operates, which can be driven via drive means such as a motor, in particular an electric motor. The piston-cylinder unit 22 comprises a cylinder with a cylinder head 23 and a piston guided in the cylinder, whereas the piston sucks refrigerant into the cylinder via an intake valve during the intake cycle and pumps the refrigerant to a higher pressure level via a pressure valve during the compression cycle before it is pushed out into a pressure section 33. The compressed refrigerant is transferred from the refrigerant compressor 19 to the refrigerant circuit via the pressure section 33. The valves each close the respective openings in a valve plate arranged in the cylinder head 23 via a crank angle of about 180°.

To keep the noise level of the refrigerant compressor 19 during the intake process as low as possible, a suction silencer 1 is attached to the cylinder head 23 in the operating position, through which suction silencer 1 refrigerant flowing into the refrigerant compressor 19 can flow from a refrigerant supply line 24 leading into the compressor housing 20 to the intake valve. In this illustration, which shows the refrigerant compressor 19 from above, the suction silencer 1 is largely covered by a cylinder head cover 32 of the cylinder head 23. In particular, however, an inlet 5 of the suction silencer 1 that protrudes from the base body of the suction silencer 1 and which comprises an inlet opening 8 (see FIG. 2) can be seen. The inlet opening 8 of the inlet 5 is located in the operating position as close as possible to the refrigerant supply line 24.

Figure 2:
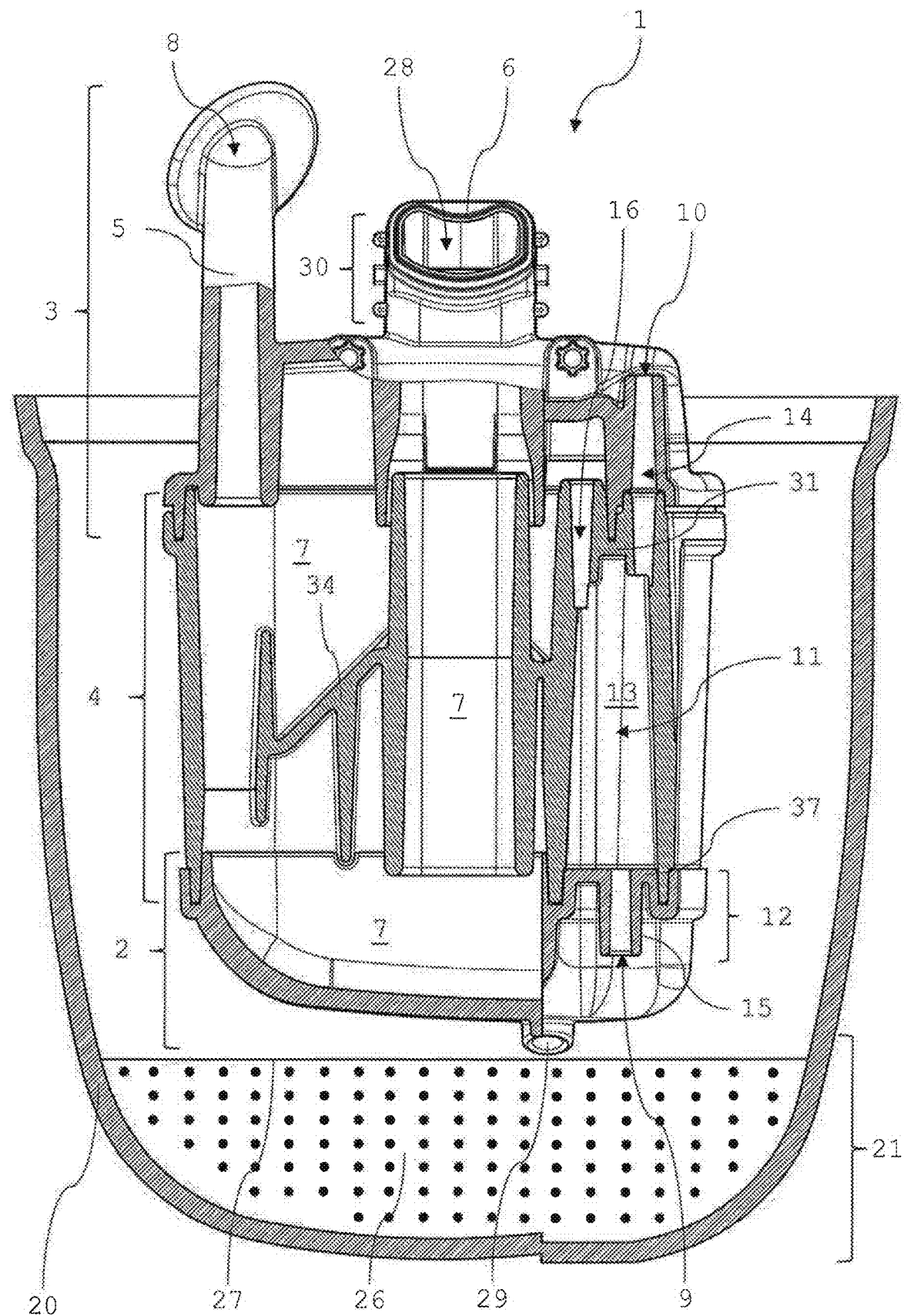
FIG. 2 shows a section view of a first execution variant of the suction silencer arranged in a compressor housing in the operating position.
Figure 3:
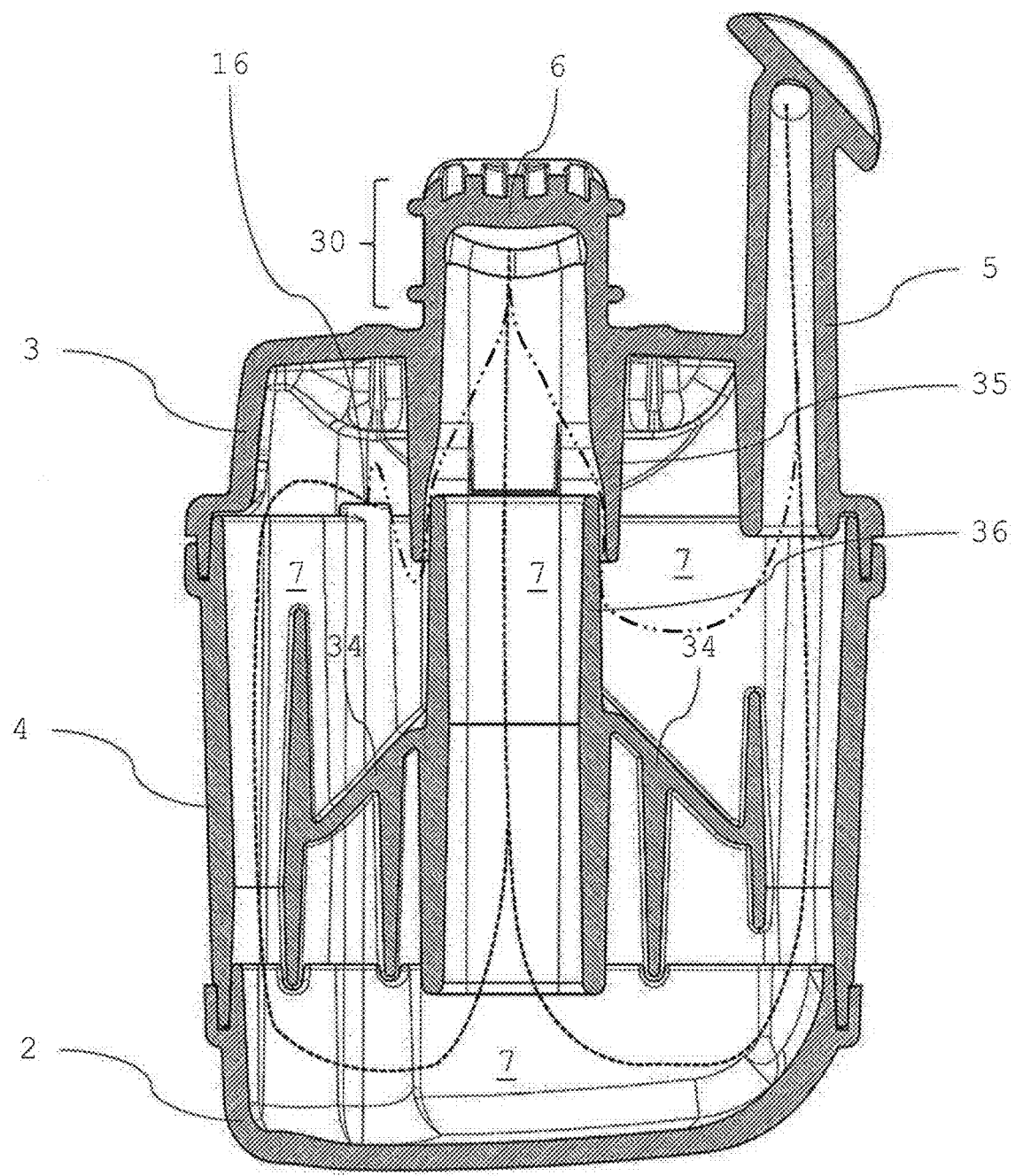
FIG. 3 shows an alternative section view of the suction silencer according to FIG. 2.
Figure 6:
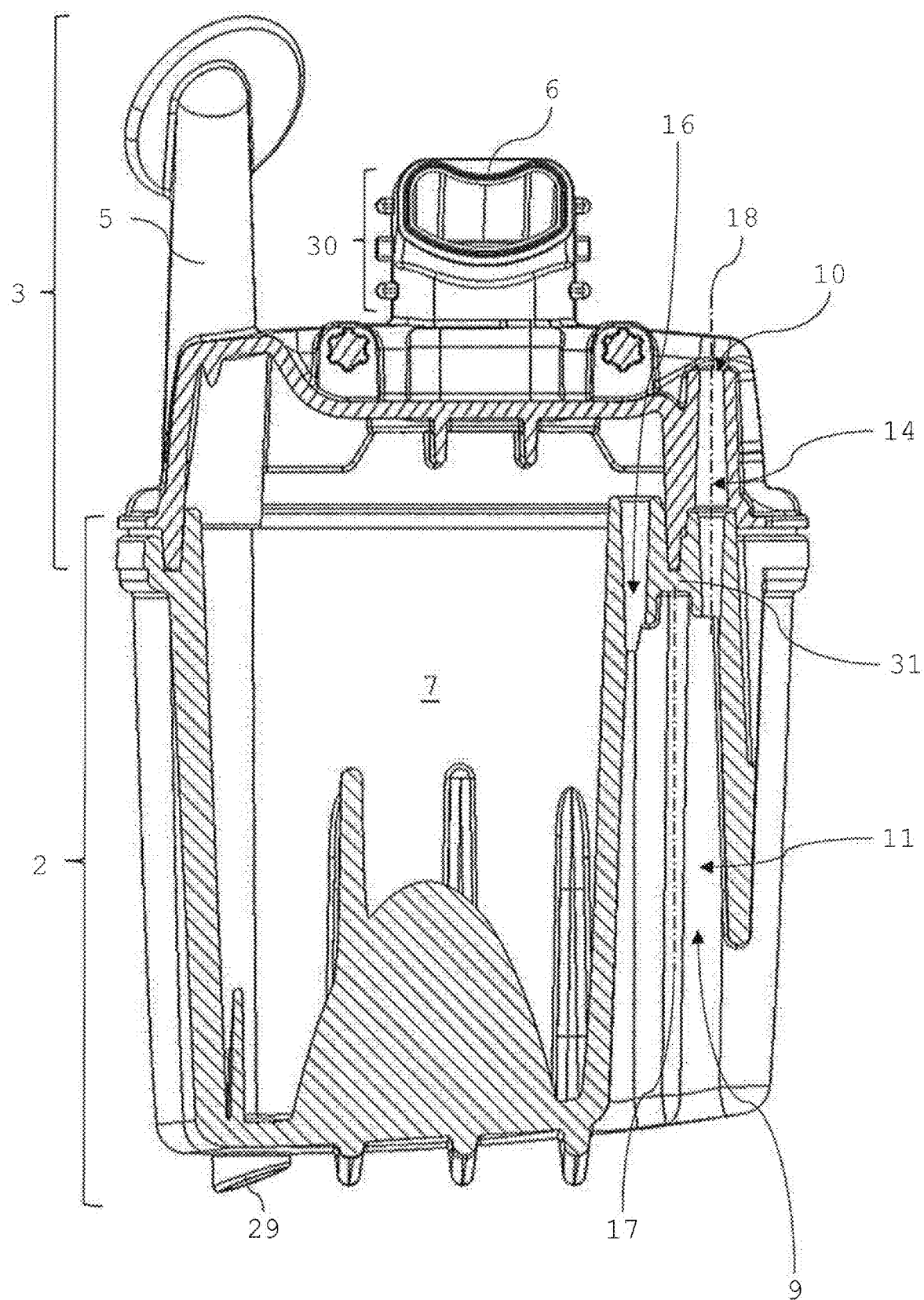
FIG. 6 shows a sectional view of the suction silencer according to FIG. 5.

The design details of the suction silencer 1 described below, which are not visible due to the arrangement of the suction silencer 1 below the cylinder head cover 32, are shown in the following illustrations. The suction silencer 1 has an outlet 6 through which the refrigerant flows or is sucked in the operating state during the intake cycle from the piston-cylinder unit 22. In this process, the outlet 6, as shown in FIGS. 2, 3 and 6, forms an attachment section 30, which attachment section 30 is integrated at least partially in the cylinder head 23 and is clamped to the piston-cylinder unit 22 through an opening of the cylinder head cover 32 so that an outlet opening 28 of the outlet 6 is positioned as close as possible to the intake valve. The main part of the volume of the suction silencer 1 is occupied by a damping chamber 7, which is arranged between the inlet 5 and outlet 6 in the direction of the refrigerant flow and, in a generally known manner, is designed to damp the sound according to the Helmholtz principle.

In this example, the main dimension of the suction silencer 1 is the height direction, which essentially corresponds to the vertical direction. In the operating position of the suction silencer 1, the height direction of the suction silencer 1 corresponds to the height direction of the refrigerant compressor 19.

To direct the refrigerant coming from the refrigerant supply line 24 directly into the suction silencer 1 without mixing or with minimal mixing with the heated refrigerant inside the compressor housing 20, a flexible connecting element 25 is arranged between the refrigerant supply line 24 and the inlet 5 in this execution example, which bridges the distance between the inlet 5 and the compressor housing 20 in the area of the refrigerant supply line 24 and functions as a line for the incoming refrigerant. As the piston-cylinder unit 22 can move relative to the compressor housing 20 due to vibrations occurring during operation, the connecting element 25 is flexible, for example, it comprises a tubular plastic part to compensate for the relative movements.

A defined amount of lubricant is provided in the refrigerant compressor 19 to lubricate the moving parts of the piston-cylinder unit 22 or the drive medium. A part of this lubricant settles in the operating condition in a trough-like bottom area 21 of the compressor housing 20 as an oil sump 26 (see FIG. 2), from where it is continuously conveyed during operation, for example via a lubrication hole in the rotor of the electric motor, to the areas to be lubricated. In other words, a lubricant circuit is formed in which part of the lubricant is located in the oil sump 26 and part of the lubricant is used for lubrication in the direction of the pumped piston-cylinder unit 22, the pumped lubricant collecting in the oil sump 26 after passing through the lubricant circuit. Due to leaks in the piston-cylinder unit 22 and lubricant mist which forms inside the compressor housing 20 and can enter the piston-cylinder unit 22 during operation via the suction silencer 1 as described below, there is always a lubricant component in the refrigerant circuit.

FIG. 2 now shows in detail the suction silencer 1 according to the invention, which, in its operating position, which corresponds to the position in FIG. 1, is arranged inside the compressor housing 20. The view corresponds to a section in parallel to the height direction. For the sake of clarity, the components of the refrigerant compressor 19 described above, with the exception of the lower half of the compressor housing 20, are not shown in this figure. To represent all details of the suction silencer 1 according to the invention, the sectional view is designed as a separate section, whereby in this example the sectional view is offset to the front approximately in the area of an oil drain hole 29. In particular, the selected cutting sequence can be traced in conjunction with FIG. 4.

The suction silencer 1 consists of a first housing part 2 which, in the operating position, constitutes the lower part of the suction silencer 1 so that its base surface faces the bottom area 21 of the compressor housing 20, a second housing part 3 which, in the operating position, constitutes the upper part of the suction silencer 1 so that its top surface faces away from the bottom area 21 of the compressor housing 20, and a third housing part 4 which functions substantially as the outer surface of the suction silencer 1 and comprises a series of intermediate or partition walls 34 arranged to allow for silencing according to the Helmholtz principle. The housing parts 2, 3, 4 consist of a synthetic material, preferably thermoplastic, and can be manufactured separately from each other, for example by means of an injection molding process. In the operating position, the three housing parts 2, 3, 4 are connected to each other in a gas-tight manner, for example by a clamping connection, so that no refrigerant can escape from the suction silencer 1 at the interface between two respective housing parts 2, 3, 4. For this purpose, as shown in the figure, the housing parts 2, 3, 4 can be connected to each other by groove and spring connections, whereby a thin film of lubricant forms, which contributes to the leakproofness during operation. Alternatively, it would also be conceivable that the housing parts 2, 3, 4 are welded together.

Both the inlet 5, through which the refrigerant from the evaporator flows into the suction silencer 1 in the operating state of the refrigerant compressor 19, and the outlet 6, through which the refrigerant from the suction silencer 1 flows in the direction of the intake valve of the piston-cylinder unit 22 in the operating state of the refrigerant compressor 19, are formed on the second housing part 3 and project from the top of the second housing part 3, the inlet 5 extending substantially tubular parallel to a height direction in the direction of the refrigerant supply line 24 and the outlet 6 having a bend, which bend is about 60°. An axis of the outlet opening 28 located at the end of the outlet 6 encloses a right angle with the height direction, so that the refrigerant is deflected by about 90° when sucked in through the outlet 6.

Inside the suction silencer 1, the damping chamber 7 is formed, which comprises several interconnected damping volumes, which are separated from each other by intermediate or partition walls 34 in order to achieve the damping effect that is generally known, as can also be clearly seen in FIG. 3. The main part of the damping chamber 7 is formed by the third part of the housing 4.

For the reasons described above, i.e. the reduction of the pressure drop in the intake stroke, the reflow of the refrigerant in the compression stroke and the evaporation of liquid refrigerant in the suction silencer 1, pressure equalization with the environment, i.e. with the inside of the compressor housing 20, must be ensured.

According to the invention, pressure equalization is ensured by two equalization chambers 11, 14, each with an opening 9, 10 for communication with the environment, the equalization chambers 11, 14 being connected to the damping chamber 7 so that refrigerant from the equalization chambers 11, 14 can pass into the damping chamber 7 during the intake cycle and refrigerant from the damping chamber 7 can pass into the equalization chambers 11, 14 during the compression cycle. Both the first equalization chamber 11 and the second equalization chamber 14 are executed in a front, lateral area of the suction silencer 1, so that as large a distance as possible is set between the inlet 5 and the equalization chambers 11, 14 or between the outlet 6 and the equalization chambers 11, 14. The first equalization chamber 11 forms the first opening 9 at the end in this case and the second equalization chamber 14 also forms the second opening 10 at the end. In this example, the first opening 9 is located on the underside of the first housing part 2 and the second opening 10 is located on the top of the second housing part 3. The arrangement of the first opening 9 on the underside of the first housing part 2 allows lubricant from the first equalization chamber 11 to drain directly into the oil sump 26 by gravity.

In the bottom of the damping chamber 7, which is formed by the bottom of the first part of the housing 2, there is an oil drain hole 29, through which oil drain hole 29 the lubricant accumulated in the damping chamber 7 can drain. The lubricant that accumulates usually comes from the oil sump 26 and enters the suction silencer 1 in small quantities when it is sucked in through the equalization chambers 11, 14, through the unavoidable, albeit small, mixture of refrigerant coming from the refrigerant supply line 24 and refrigerant coming from the inside of the compressor housing 20. The refrigerant coming from the refrigerant supply line 24 also usually contains a small proportion of lubricant, which gets into the compressed or to be compressed refrigerant due to leakage in the piston-cylinder unit 22. This component usually forms the major part of the lubricant collecting in the suction silencer 1 during operation. The refrigerant inside the compressor housing 20 also contains lubricant in the form of drops from the lubricant mist that forms. These small amounts of lubricant are deposited on the walls of the damping chamber 7 and then flow into the bottom area of the damping chamber 7 to return to the oil sump 26 through the oil drain hole 29. Due to its function and design, the oil drain hole 29 is not an equalization chamber in the sense of the invention, as it is usually closed by a small oil film and is in any event not dimensioned correctly to allow pressure equalization with the inside of the compressor housing 20. When small quantities of drop-shaped lubricant are also sucked into the cylinder, it passes through the entire refrigerant circuit and returns via the inlet 5 to the suction silencer 1, from where it in turn passes through the oil drain hole 29 into the oil sump 26.

During operation of the refrigerant compressor 19, in particular during start-up, a level 27 of the oil sump 26 may rise under various operating conditions, as described in detail above. This may be the case, for example, if the refrigerant condenses and a liquid refrigerant/lubricant mixture is formed or if the refrigerant/lubricant mixture boils due to the negative pressure formed when the compressor is started up, causing a refrigerant/lubricant foam to be formed, which allows the level 27 to rise, at least temporarily. In these operating conditions, the first opening 9 may be closed by the oil sump 26. If only the first equalization chamber 11 were intended, as is known from the state of the art, a closure of the first opening 9 on the underside of the first housing part 2 would result in the pressure equalization with the environment no longer taking place, so that, on the one hand, during the intake cycle, the pressure drop in the damping chamber cannot be equalized and less refrigerant is sucked into the piston-cylinder unit 22, which leads to a loss of performance. On the other hand, there would be a risk that liquid lubricant or liquid refrigerant/lubricant mixture or refrigerant/lubricant foam would be sucked into the piston/cylinder unit 22 and damage the valve springs there. Furthermore, when liquid refrigerant enters and evaporates through the refrigerant supply line 24, the excess pressure created during evaporation may not be compensated and the suction silencer 1 or flexible connecting element 25 may be damaged.

To avoid these risks, the second equalization chamber 14 is provided with the second opening 10, whereby the second opening 10 is arranged above the first opening 9, in accordance with the invention, i.e. at a greater distance from the bottom area 21 and therefore also from the level 27 of the oil sump 26 than the first opening 9. Therefore, even if pressure equalization through the first opening 9 is no longer possible or if lubricant or lubricant foam is sucked in through the first opening 9, gaseous refrigerant can still enter the second equalization chamber 14 from the inside of the compressor housing 20 during the suction cycle or refrigerant can exit the second equalization chamber 14 into the inside of the compressor housing 20 during the compression cycle so that pressure equalization of the damping chamber 7 is ensured. The arrangement of the suction silencer 1 in the compressor casing 20 is achieved by executing the fastening section 30 formed by the outlet 6 and clamped to the piston-cylinder unit 22 by the cylinder head cover 32. The fastening section 30 is executed so that the first opening 9 is located closer to the bottom area 21 than the second opening 10 or the second opening 10 is located above the first opening 9 relative to the bottom area 21 when the suction silencer 1 is attached to the piston-cylinder unit 22 via the fastening section 30.

In this example, the first equalization chamber 11 is formed in both the first housing part 2 and the third housing part 4, with the first opening 9 facing the bottom area 21 but offset upward from the bottom or the lowest point of the suction silencer 1. In other words, the first housing part 2 defines a first section 12 and the third housing part 4 defines a second section 13 of the first equalization chamber 11 so that the first opening 9 is formed by the first section 12. The main part of the volume of the first equalization chamber 11 is formed by the second section 13, which has both a greater height and a larger average cross-sectional area than the first section 12. The first section 12, on the other hand, is formed by a tubular extension 15 of the first housing part 2, which has a smaller cross-sectional area than the second section 13. The tubular extension 15 with the first opening 9 therefore acts as a cross-sectional constriction so that the cross-sectional area of the first opening 9 can be easily defined. It can be clearly seen that the second section 13 is limited below by a lower limit section 37, which has the tubular extension 15 and is formed by the first housing part 2 and via which the cross-sectional constriction is realized. Given the fact that the first housing part 2 and the third housing part 4 are formed separately from each other, the lower limit section 37 as well as the surrounding of the second section 13 can be produced in a simple manner by means of injection molding processes. The leakproofness between the two housing parts 2, 4 is realized by a groove and spring connection. It goes without saying that in alternative execution variants, the first opening 9 can be formed directly from the lower limit section 37, without a tubular extension 15.

The first equalization chamber 11 limits a volume which corresponds to about 10% or 0.1 times the stroke volume of the piston, whereby the volume of the first equalization chamber 11 is about 10 times as large as the corresponding volume of the second equalization chamber 14.

The second equalization chamber 14 is formed at least in sections in the second housing part 3, at least the part of the second equalization chamber 14 having the second opening 10 being formed in the second housing part 3 in order to produce as large a distance as possible between the second opening 10 and the bottom area 21. In this example, the second equalization chamber 14 is formed in both the second housing part 3 and third housing part 4. The first equalization chamber 11 and second equalization chamber 14 are directly connected so that a direct exchange of refrigerant between the expansion chambers 11, 14 can take place. To this end, the end of the second equalization chamber 14 opposite the second opening 10, in this case the lower end, opens out into the end of the first equalization chamber 11 opposite the first opening 9, in this case the upper end. This upper end of the first equalization chamber 11 is formed by an upper limit section 31 formed by the third housing part 4. The section of the second equalization chamber 14 adjacent to the second opening 10 is formed by the second housing part 3 and the section adjacent to the upper limit section 31 is formed by the third housing part 4, so that the height of the second equalization chamber 14 can be maximized. The second equalization chamber 14 is tubular and extends along a second longitudinal axis 18 (see FIG. 6), the cross section of the second equalization chamber 14 being approximately circular normal to the second longitudinal axis 18. The second longitudinal axis 18 runs in a straight line. The cross section of the second equalization chamber 14 changes slightly over the entire length of the second equalization chamber 14, reaching a maximum at the interface between the second and third housing parts 3, 4. The cross-sectional area of the second opening 10 is substantially the same as the cross-sectional area of the first opening 9.

By the arrangement described above, the first opening 9 and the second opening 10 are arranged opposite each other, which produces the additional effect that lubricant entering the second equalization chamber 14 through the second opening 10 can run down along the wall of the second equalization chamber 14 and the adjoining first equalization chamber 11 and finally exit the suction silencer 1 through the first opening 9 without being able to enter the damping chamber 7 or accumulate in one of the equalization chambers 11, 14. This effect can, of course, also be achieved in alternative execution variants if the openings 9, 10 are offset in height and the directly connected equalization chambers 11, 14 form a constant gradient. If the two openings 9, 10 are viewed from above, i.e. in the direction of the longitudinal axes 17, 18, the openings 9, 10 overlap in this example.

To enable the exchange of gaseous refrigerant between the equalization chambers 11, 14 and the damping chamber 7, a transition channel 16 is formed in the third part of the housing 4, which connects the damping chamber 7 directly with the first equalization chamber 11 and indirectly with the second equalization chamber 11 opening into the first equalization chamber 14. The transition channel 16, like the second equalization chamber 14, opens into the end of the first equalization chamber 11 opposite the first opening 9, i.e. into the upper limit section 31, so that the distance between the opening end of the transition channel 16 and the respective openings 9, 10 of the first equalization chamber 11 or second equalization chamber 14 is as large as possible. In order to ensure easy manufacture during injection molding, the transition channel 16 is aligned in parallel to the two equalization chambers 11, 14. In addition, the cross-sectional area of the transition channel 16 is in the area of the cross-sectional area of the second equalization chamber 14. The discharge of the second equalization chamber 14 and the transition channel 16 means that these end directly in the first equalization chamber 11. The first equalization chamber 11 is limited by the upper limit section 31 at the end opposite the first opening 9, which closes off the first equalization chamber 11 at the top and is penetrated only by the entering second equalization chamber 14 and the entering transition channel 16, so that the first equalization chamber 11 communicates directly with the inside of the compressor housing 20 only via the first opening 9.

FIG. 3 shows an alternative sectional view of the suction silencer 1 in which the equalization chambers 11, 14 and the two openings 9, 10 are located behind the sectional surface. The end of the transition channel 16 leading into the damping chamber 7 can be seen, via which refrigerant can be exchanged between the equalization chambers 11, 14 and the damping chamber 7. Also shown are the intermediate and partition walls 34 that limit individual damping volumes within the damping chamber 7 for sound damping. The outlet 6 is continued inside the suction silencer 1 as an outlet nozzle 35 formed by the second housing part 3 into which a channel 36 formed by the third housing part 4 opens. This channel 36 extends over the entire height of the third part of the housing 4 to maximise the section of refrigerant passing through between the inlet 8 and outlet openings 28, thereby improving sound damping. A gap is formed between the outlet nozzle 35 and the upper end section of the channel 36 normal to the height direction through which refrigerant can flow from the transition channel 16 and from the inlet 5 to the outlet 6, respectively. Through this gap, which has very small dimensions and therefore a high flow resistance, only a small amount of refrigerant flows during normal operation. If, however, the damping chamber 7 is filled with refrigerant and the lower end of the channel 36 is closed, for example because the refrigerant compressor 19 has been filled with liquid refrigerant via the refrigerant supply line 24 and not via a process tube, gaseous refrigerant can flow via the gap both from the transition channel 16 and from the inlet 5 to the outlet opening 28.

Below is a brief description of how the equalization chambers 11, 14 work:

In the intake cycle, the refrigerant in the damping chamber 7 or the refrigerant flowing downstream is sucked in via the outlet 6 and the open intake valve through the suction silencer 1 into the cylinder of the piston-cylinder unit 22, whereby part of the refrigerant in the equalization chambers 11, 14 is sucked in again via the transition channel 16 into the damping chamber 7 for pressure equalization due to the suction effect. This flow is divided into two main lines, which are shown as dashed lines. The main branch of the flow, which usually provides the bulk of the refrigerant, runs from the inlet 5 to the bottom of the suction silencer 1 and then through the channel 36 and outlet 6 to the outlet opening 28. The secondary branch, via which the pressure equalization of the suction silencer 1 is carried out, runs through the corresponding openings 9, 10 of the equalization chambers 11, 14, not shown in this illustration, into the equalization chambers 11, 14 themselves, and further through the transition channel 16 into the damping chamber 7, where the secondary branch unites with the main branch in the bottom area of the suction silencer 1 before entering the channel 36.

A small part of the refrigerant also flows directly, without first being led to the bottom area, from the inlet 5 or from the transition channel 16 to the outlet via the gap between the outlet nozzle 35 and the channel 36 described above. This bypass flow course is shown as a dashed two-dot line. While only a negligibly small amount of refrigerant flows through the bypass flow during normal operation, the gap ensures that gaseous refrigerant can be sucked into the piston-cylinder unit 22, even if the lower end of the channel 36 is closed, e.g. by liquid refrigerant.

Via the openings 9, 10 in the equalization chambers 11, 14, refrigerant heated in the intake cycle is sucked into the equalization chambers 11, 14 from the environment, i.e. from the inside of the compressor housing 20, so that a pressure equalization takes place between the suction silencer 1 and the environment. During the compression cycle, gaseous refrigerant flows out of the refrigerant supply line 24 into the damping chamber 7 and pushes the refrigerant in the damping chamber via the transition channel 16 into the equalization chambers 11, 14 or out of the equalization chambers 11, 14 into the inside of the compressor housing 20. In both equalization chambers 11, 14, a gas column oscillates or pulsates during the operation of the refrigerant compressor 19, which, depending on the crank angle, consists of different parts of refrigerant from the damping chamber 7 and heated refrigerant from the inside of the compressor housing 20. During operation, however, there is only a small mixing of cold and warm refrigerant, which must be accepted due to the necessary pressure equalization. In addition, as described in detail above, the pressure drop in the suction silencer 1 is reduced by pressure equalization via the equalization chambers 11, 14 and the resulting secondary load, thus improving the efficiency of the refrigerant compressor 19.

During the compression stroke of the piston-cylinder unit 22, refrigerant coming from the evaporator flows through the refrigerant supply line 24, the flexible connecting element 25 and the inlet 5 to the suction silencer 1 (see FIG. 1). As the intake valve is closed in this cycle, the refrigerant flowing in due to the pressure difference and the kinetic energy first fills the damping chamber 7, excess refrigerant flowing via the transition channel 16 into the first equalization chamber 11 and from there, on the one hand, in the direction of the first opening 9 and, on the other hand, due to the higher flow resistance caused by the smaller cross-sectional area in smaller quantity, flows into the second equalization chamber 14 or in the direction of the second opening 10. A part of the refrigerant in the equalization chambers 11, 14 is pushed out by the refrigerant flowing in through the respective opening 9, 10 into the environment, i.e. into the inside of the compressor housing 20, so that pressure equalization between the suction silencer 1 and the environment also takes place in the compression cycle. This is particularly necessary if liquid refrigerant enters the suction silencer 1 via the refrigerant supply line 24 and evaporates there.

In an alternative design variant, it may also be provided that the two equalization chambers 11, 14 are each directly connected to the damping chamber 7 and do not merge into each other, so that the two equalization chambers 11, 14 can be designed in different areas of the suction silencer 1.

Figure 4:
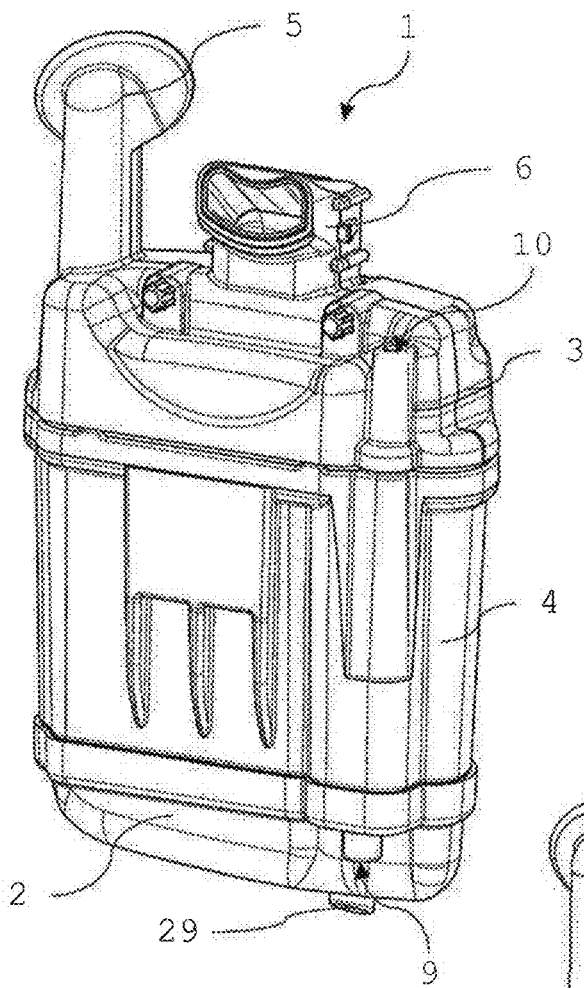
FIG. 4 shows an isometric view of the suction silencer according to FIG. 2.

FIG. 4 shows a three-dimensional illustration of the suction silencer 1 described above, which illustrates the shape of the suction silencer 1 and the arrangement of the two equalization chambers 11, 14 or the two openings 9, 10. The three-part execution of the suction silencer 1 consisting of three housing parts 2, 3, 4 can be seen, on the one hand, and the arrangement of the equalization chambers 11, 14 concealed by the wall in the diagonally opposite corner area of the inlet 5 of the suction silencer 1, on the other.

Figure 5:
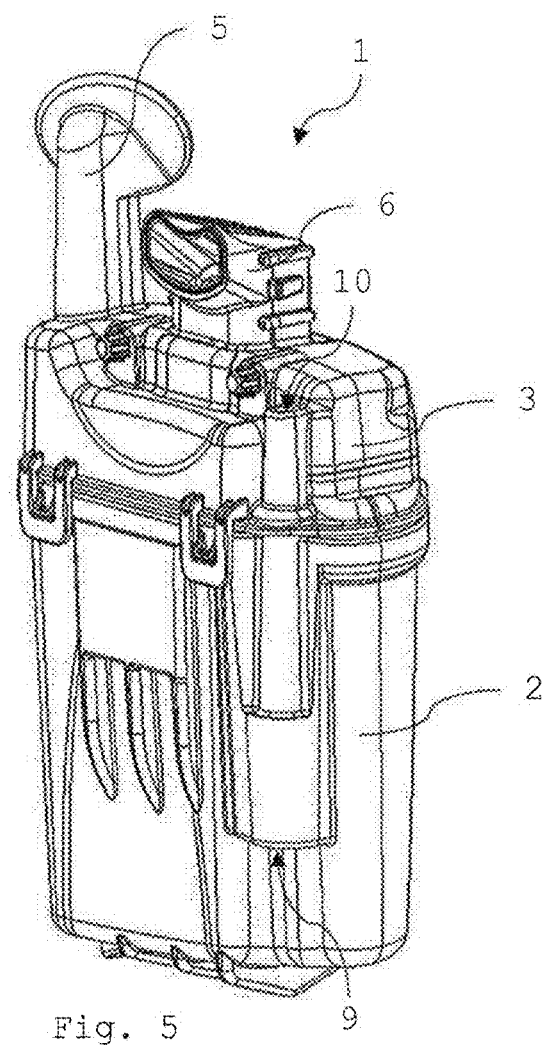
FIG. 5 shows an isometric view of a second version of the suction silencer.

A second version of the invention is shown in FIG. 5 as a three-dimensional view. The basic execution of the suction silencer 1 is essentially the same as the first version, especially with regard to the function of the equalization chambers 11, 14, the design of the damping chamber 7 and the arrangement of inlet 5 and outlet 6. For this reason, only the differences between the two versions will be discussed below. One difference is that the suction silencer 1 consists of only two housing parts 2, 3, the first housing part 2 forming the lower part of the suction silencer 1 and a major part of the outer surface of the suction silencer 1, and the second housing part 3 forming the upper part of the suction silencer 1 including inlet 5 and outlet 6.

FIG. 6 shows a sectional view of the second version of the suction silencer 1 similar to FIG. 2, but as a non-offset section, which is why, for example, the channel 36 is not visible. The first opening 9 of the first equalization chamber 11 faces the bottom area 21 of the compressor housing 20 (see FIG. 2) and is formed from the lower end of the first equalization chamber 11. In contrast to the first version, the first equalization chamber 11 is completely formed by the first housing part 2, whereby the first opening 9 is formed as the lower, open end of the first equalization chamber 11. In other words, the cross-sectional area of the first opening 9 corresponds essentially to the mean cross-sectional area of the first equalization chamber 11. The first balancing chamber 11 is tubular, i.e. a hollow body, and runs along a first longitudinal axis 17. The first longitudinal axis 17 runs along a straight line and is aligned in parallel to the height direction of the suction silencer 1 or refrigerant compressor 19. The cross section of the first equalization chamber 11 normal to the first longitudinal axis 17 is a rounded rectangle, the cross section changing only slightly over the extension along the first longitudinal axis 17 and being considered approximately constant, so that the cross section of the first opening 9 corresponds substantially to the cross section of the first compensating chamber 11. In other words, the first equalization chamber 11 has no lower limit section (see FIG. 2). The transition channel 16 running parallel to the first longitudinal axis 17 of the first equalization chamber 11 and opening into the first equalization chamber 11 in the area of the upper limit section 31 is formed from the first part of the housing 2 in this version and connects the first equalization chamber 11 with the damping chamber 7 in the same way as the first version.

As in the first example, the second equalization chamber 14 extends over two housing parts 2, 3, the first housing part 2 and second housing part 3, and runs along the second longitudinal axis 18. The distance between the longitudinal axes 17, 18 is chosen so that the cross section of the second opening 10 overlaps the cross section of the first opening 9 by about 50% when looking at the equalization chambers 11, 14 from below in the direction of the longitudinal axes 17, 18. The design of the upper limit section 31 formed by the first housing part 2 and of the transition channel 16 connecting the first equalization chamber 11 with the damping chamber 7 corresponds to the design described in the first version.

LIST OF REFERENCE NUMBERS

1 Suction silencer
2 First housing part
3 Second housing part
4 Third housing part
5 Inlet
6 Outlet
7 Damping chamber
8 Inlet opening
9 First opening
10 Second opening
11 First equalization chamber
12 First section of the first equalization chamber
13 Second section of the first equalization chamber
14 Second equalization chamber
15 Tubular extension
16 Transition channel
17 First longitudinal axis 18 Second longitudinal axis
19 Refrigerant compressor
20 Compressor housing
21 Bottom area
22 Piston-cylinder unit
23 Cylinder head
24 Refrigerant supply line
25 Connecting element
26 Oil sump
27 Level of the oil sump 26
28 Outlet opening
29 Oil drain hole
30 Fastening section
31 Upper limit section
32 Cylinder head cover
33 Pressure section
34 Intermediate or partition wall
35 Outlet nozzle
36 Channel
37 Bottom limit section

What is claimed is:

1. A suction silencer for an encapsulated refrigerant compressor, with
an inlet to allow refrigerant to flow into the suction silencer,
an outlet to allow refrigerant to escape from the suction silencer toward a piston-cylinder unit of the refrigerant compressor,
a damping chamber connecting the inlet and the outlet for sound damping, and
an equalization chamber communicating with the damping chamber and communicating with the environment for equalizing the pressure of the damping chamber with the environment,
wherein the suction silencer is provided in an operating position for integration in a compressor housing of the refrigerant compressor, which compressor housing has a trough-like bottom area for integration of an oil sump, wherein the equalization chamber is formed as a first equalization chamber with a first opening for pressure equalization, and the suction silencer has a further, second equalization chamber with a second opening for pressure equalization,
wherein the volume of the first equalization chamber is dimensioned such that the volume is 0.05 to 2 times a stroke volume of the piston of the piston-cylinder unit.

2. The suction silencer in accordance with claim 1, wherein the suction silencer has at least one fastening section for connection to the piston-cylinder unit and that the at least one fastening section is designed in such a way as to enable a fastening of the suction silencer to the piston-cylinder unit, in which the second opening is arranged above the first opening with respect to the bottom area of the compressor housing.

3. The suction silencer according to claim 1, wherein a flexible connecting element for connecting an inlet opening of the suction silencer arranged at the inlet with a refrigerant supply line opening into the compressor housing in the operating position is fastened at the inlet in order to allow refrigerant to flow directly from a refrigerant supply line into the suction silencer.

4. The suction silencer in accordance with claim 1, wherein the suction silencer comprises at least a first housing part and a second housing part, the inlet and/or the outlet being formed by the second housing part.

5. The suction silencer in accordance with claim 4, wherein the first equalization chamber, having the first opening, is formed in the first housing part.

6. The suction silencer according to claim 4, wherein the second equalization chamber is formed at least in sections in the second housing part, the second opening being formed in the second housing part.

7. The suction silencer in accordance with claim 1, wherein the suction silencer comprises, as a minimum, a first housing part, a second housing part and a third housing part, whereas the third housing part is arranged between the first housing part and the second housing part.

8. The suction silencer according to claim 7, wherein the first equalization chamber has a first section limited by the first housing part and a second section bounded by the third housing part, the first opening being formed in the first section.

9. The suction silencer according to claim 8, wherein the first section, which is narrower than the second section, is formed as a tubular extension of the first housing part.

10. The suction silencer according to claim 8, wherein the cross-sectional area of the first opening is between 5% and 50% of an average cross-sectional area of the first equalization chamber.

11. The suction silencer of claim 10 wherein the cross-sectional area of the first opening is between 10% and 30% of an average cross-sectional area of the first equalization chamber.

12. The suction silencer of claim 10 wherein the cross-sectional area of the first opening is between 15% and 20% of an average cross-sectional area of the first equalization chamber.

13. The suction silencer according to claim 1, wherein the second equalization chamber opens into the first equalization chamber.

14. The suction silencer according to claim 1, wherein the first equalization chamber has a first longitudinal axis and is of tubular design and/or that the second equalization chamber has a second longitudinal axis and is of tubular design.

15. The suction silencer according to claim 14, wherein the first longitudinal axis and the second longitudinal axis are arranged in parallel to one another.

16. The suction silencer of claim 15 wherein the first longitudinal axis and the second longitudinal axis are in alignment.

17. The suction silencer according to claim 14, wherein a cross section of the second opening, seen in the direction of the first longitudinal axis overlaps the cross section of the first opening.

18. The suction silencer of claim 17 wherein the cross section of the second opening seen in the direction of the first longitudinal axis and the second longitudinal axis overlaps the cross section of the first opening.

19. The suction silencer of claim 14 wherein the tubular design comprises a circular cross section.

20. The suction silencer according to claim 1, wherein the volume of the second equalization chamber is between 5% and 25% of the volume of the first equalization chamber.

21. The suction silencer of claim 20 wherein the volume of the second equalization chamber is between 10% and 20% of the volume of the first equalization chamber.

22. The suction silencer of claim 20 wherein the volume of the second equalization chamber is between 12% and 17% of the volume of the first equalization chamber.

23. The suction silencer according to claim 1, wherein a cross-sectional area of the second opening is between 5% and 50% of an average cross-sectional area of the first equalization chamber.

24. The suction silencer of claim 23 wherein the cross-sectional area of the second opening is between 10% and 30% of an average cross-sectional area of the first equalization chamber.

25. The suction silencer of claim 23 wherein the cross-sectional area of the second opening is between 15% and 20% of an average cross-sectional area of the first equalization chamber.

26. The suction silencer according to claim 1, wherein a transition channel connects the damping chamber to the first equalization chamber to allow the exchange of refrigerant, the transition channel being located in an end region of the first equalization chamber opposite the first opening and/or in that a transition channel connects the damping chamber to the second equalization chamber in order to permit the exchange of refrigerant.

27. The suction silencer according to claim 26, wherein the suction silencer comprises, as a minimum, a first housing part, a second housing part and a third housing part, and wherein the transition channel is arranged in parallel to a first longitudinal axis of the first equalization chamber and is formed in the first housing part or the third housing part.

28. The suction silencer of claim 1 wherein the volume of the first equalization chamber is 0.1 to 1 times the stroke volume of the piston.

29. The suction silencer of claim 1 wherein the volume of the first equalization chamber is 0.2 to 0.5 times the stroke volume of the piston.

30. An encapsulated refrigerant compressor including the suction silencer of claim 1 that has the compressor housing with a refrigerant supply line opening into the compressor housing, wherein refrigerant can be supplied via the refrigerant supply line, wherein inside the compressor housing, the piston-cylinder unit cyclically compressing the refrigerant operates with an intake valve comprising an inlet opening arranged in a valve plate of the piston-cylinder unit, wherein the compressor housing has the trough-shaped base bottom area for receiving the oil sump for lubricating the piston-cylinder unit; wherein the suction silencer conducts the refrigerant from the refrigerant supply line to the intake valve and is arranged in the compressor housing in the operating position in such a way, that the second opening is arranged above the first opening in relation to the trough-shaped bottom area of the compressor housing.

31. The refrigerant compressor according to claim 30, wherein the suction silencer is arranged in the compressor housing in such a way that at least the second opening of the second equalization chamber is arranged above a level of the oil sump forming in the bottom area.

32. The refrigerant compressor of claim 31 wherein the at least second opening comprises the first opening and the second opening.

33. The refrigerant compressor of claim 31 wherein at least the second opening of the second equalization chamber is arranged above a level of the oil sump forming in a rest phase of the refrigerant compressor.

34. The refrigerant compressor according to claim 30, wherein a fastening section of the suction silencer is fixed to a cylinder head of the piston-cylinder unit.

35. The refrigerant compressor according to claim 30, wherein a flexible connecting element connects the refrigerant supply line and an inlet opening of the suction silencer formed from the inlet to each other in order to allow refrigerant to flow from the refrigerant supply line via the suction silencer directly to the intake valve.

36. The refrigerant compressor according to claim 30, wherein the first opening faces the bottom area and the second opening faces away from the bottom area.

37. The refrigerant compressor of claim 30 wherein the compressor housing is hermetically sealed.

* * * * *